(12) United States Patent
Duan et al.

(10) Patent No.: US 12,098,225 B2
(45) Date of Patent: Sep. 24, 2024

(54) PREPARATION METHOD FOR AMPHIPHILIC NANOSHEET

(71) Applicant: Southwest Petroleum University, Chengdu (CN)

(72) Inventors: Ming Duan, Chengdu (CN); Yinan Xu, Chengdu (CN); Jian Zhang, Beijing (CN); Shenwen Fang, Chengdu (CN); Gang Wu, Chengdu (CN); Xinliang Li, Chengdu (CN); Yuhan Wu, Chengdu (CN); Mengyuan Nie, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 18/560,931

(22) PCT Filed: Jul. 14, 2023

(86) PCT No.: PCT/CN2023/107428
§ 371 (c)(1),
(2) Date: Nov. 15, 2023

(87) PCT Pub. No.: WO2024/103813
PCT Pub. Date: May 23, 2024

(65) Prior Publication Data
US 2024/0270884 A1    Aug. 15, 2024

(30) Foreign Application Priority Data
Nov. 15, 2022  (CN) .......................... 202211430277.9

(51) Int. Cl.
C08F 212/08  (2006.01)
C08F 220/34  (2006.01)
(52) U.S. Cl.
CPC .......... *C08F 212/08* (2013.01); *C08F 220/34* (2013.01)

(58) Field of Classification Search
CPC .......................... C08F 212/08; C08F 220/34
See application file for complete search history.

(56) References Cited

U.S. PATENT DOCUMENTS

2015/0299240 A1    10/2015  Cheng

FOREIGN PATENT DOCUMENTS

| CN | 113087837 A | 7/2021 |
|----|-------------|--------|
| CN | 114904399 A | 8/2022 |

*Primary Examiner* — Catherine S Branch
(74) *Attorney, Agent, or Firm* — Andrew C. Cheng

(57) ABSTRACT

The present invention discloses a preparation method for an amphiphilic nanosheet. The preparation method comprises the following steps: mixing choline chloride and urea, and heating to prepare a choline chloride-urea based deep eutectic solvent; adding styrene, divinylbenzene and azobisisobutyronitrile into a higher alkane solvent, stirring and dissolving to obtain an oil phase solvent, wherein an addition amount of the divinylbenzene is greater than 5% by mass of a styrene monomer; and adding a hydrophilic monomer, cetyltrimethylammonium chloride and the oil phase solvent into the deep eutectic solvent, stirring and mixing, ventilating and deoxidizing, then heating to 70° C., reacting for at least 6 h, and then crushing and centrifuging to obtain the amphiphilic nanosheet. According to the present invention, a block polymer does not need to be prepared in advance, and a hydrophobic monomer and a hydrophilic monomer are physically isolated, so that the prepared amphiphilic nanosheet has a distinct partition and is not easy to agglomeration. The method is similar to conventional emulsion polymerization, the amphiphilic nanosheet is prepared by a one-step method, and the preparation process is simple; and the method has high product yield and is easy for mass production.

3 Claims, 19 Drawing Sheets

PREPARATION METHOD FOR AMPHIPHILIC NANOSHEET

BACKGROUND

1. Technical Field

The present invention relates to the technical field of polymer materials, and specifically, to a preparation method for an amphiphilic nanosheet.

2. Description of Related Art

An amphiphilic nanosheet is a sheet-like substance belonging to Janus nanomaterials, and has two parts with different compositions and chemical properties, wherein one side of the amphiphilic nanosheet is composed of a hydrophobic material, and the other side of the amphiphilic nanosheet is composed of a hydrophilic material; therefore, the amphiphilic nanosheet has an amphiphilic property. Moreover, since a longitudinal dimension of the amphiphilic nanosheet is nano-scale, the amphiphilic nanosheet also has a large specific surface area, a high aspect ratio, abundant active sites, and high flexibility. These characteristics endow the amphiphilic nanosheet with unique performances.

At present, the components of the amphiphilic nanosheet have heterogeneity, which causes a great difficulty in the large-scale preparation or industrial production of the amphiphilic nanosheets. Researchers have conducted extensive and intensive research on the mass production of amphiphilic nanosheets, however, there are still many problems. Firstly, the amphiphilic nanosheet is prepared by cross-linking amphiphilic block polymers; since the block polymers cannot completely separate hydrophobic chains from hydrophilic chains, the prepared nanosheet has a hydrophilic part and a hydrophobic part on two sides instead of a hydrophilic part at one side and a hydrophobic part at the other side, consequently, the partition is not distinct. Second, the hydrophilic and hydrophobic parts in the partition of the amphiphilic nanosheet are not distinct, which makes them easy to aggregate. This is extremely disadvantageous for the application of amphiphilic nanosheets. Finally, the mass preparation of amphiphilic nanosheets all involves the block polymer preparation, dehydration, and cross-linking steps. These steps are relatively complicated and require precise control of the preparation of the product in each step, which makes industrial production more difficult.

Based on the exploration and research of researchers on the preparation method for the nanosheet, the preparation methods for an amphiphilic nanosheet with a distinct partition in small batches in the laboratory can be roughly classified into the following: a template method, a sol-gel method, a self-assembly method, an interfacial reaction method, and an exfoliation method. However, these methods have great limitations in industrial production. Specifically, the template method firstly relates to the preparation of a nanosheet-like template, and the reaction construction is challenging, consequently, the yield of the amphiphilic nanosheet is seriously influenced, and the method is significantly unfavorable for industrial production; according to the sol-gel method and the interfacial reaction method, a hydrolysis reaction of a silane coupling agent generally occurs at an oil-water interface, which easily causes demulsification of the emulsion, consequently, the preparation of the nanosheets is interrupted, and the control is difficult, thereby greatly increasing the industrialized operation; although the self-assembly method and the exfoliation method have simple steps, the reproducibility is poor in the preparation processes in small batches in the laboratory, and the process controllability is poor, and consequently, the industrialization and mass production of the amphiphilic nanosheet are not practical. Therefore, it is still a huge challenge to develop a preparation method for an amphiphilic nanosheet with universal reaction selection and easy process control.

SUMMARY

In view of this, to solve at least one of the above problems, the present invention provides a preparation method for an amphiphilic nanosheet, which has the advantages of a simple preparation process and high product yield. A technical solution of the present invention is as follows.

The preparation method for an amphiphilic nanosheet comprises the following steps:

S1. preparation of a choline chloride-urea based deep eutectic solvent: mixing choline chloride and urea, and heating to prepare the choline chloride-urea based deep eutectic solvent.

S2. preparation of an oil phase solvent: adding styrene, divinylbenzene (a cross-linking agent) and azobisisobutyronitrile into a higher alkane solvent, stirring and dissolving to obtain an oil phase solvent, wherein an addition amount of the divinylbenzene is greater than 5% by mass of a styrene monomer, when the addition amount of the divinylbenzene is less than or equal to 5%, the obtained product is agglomerated particles and non-nanosheet; an addition amount of azobisisobutyronitrile is an addition amount of conventional emulsion polymerization, for example, 1% of a total mass of styrene and divinylbenzene.

S3. preparation of the amphiphilic nanosheet: adding a hydrophilic monomer, cetyltrimethylammonium chloride and the oil phase solvent prepared in the step S2 into the choline chloride-urea based deep eutectic solvent prepared in the step S1, stirring and mixing, ventilating and deoxidizing, then heating to 70° C., reacting for at least 6 h to obtain a product with a hollow morphology, and then crushing (such as ultrasonic crushing) and centrifuging the product to obtain the amphiphilic nanosheet (with a sheet-like morphology). A mass of the hydrophilic monomer is not greater than 20% by mass of the deep eutectic solvent. If the mass of the hydrophilic monomer is too high, the hydrophilic monomer, especially acrylic acid and acrylamide, will be polymerized preferentially to form gel in the reaction system and cannot be polymerized with the hydrophobic monomer at the interface.

In the step S1, the choline chloride dehydration is a conventional operation, and the specific operating parameters can be adjusted based on an actual situation and are not described in detail herein. The choline chloride and the urea are mixed and heated.

In the step S1, a ratio of the choline chloride to the urea affects the reaction in the step S3, and the molar ratio of the choline chloride to the urea should be 1:1 to 1:3. A molar ratio that is too high or too low will cause the melting point of the deep eutectic solvent formed to be higher than 50° C., which is not conducive to the dissolution and mixing of the monomers.

In the step S2, the higher alkane solvent is mainly used to dissolve styrene, divinylbenzene (a cross-linking agent) and azobisisobutyronitrile. As a specific embodiment of the present invention, the higher alkane solvent is any one of dodecane, tetradecane and hexadecane. A total volume ratio of the higher alkane solvent to the styrene and divinylbenzene is greater than 3:1, and a volume ratio of the higher alkane to the polymerizable hydrophobic substance is too small, consequently, a wall thickness of the prepared hollow microsphere is too large to be crushed into nanosheets.

As a specific embodiment of the present invention, an addition amount of the cetyltrimethylammonium chloride is within a range of 0.05% to 0.1% by the mass of the deep eutectic solvent. When this addition amount is too high, the prepared microspheres have too small particle sizes to be crushed into nanosheets, and when this addition amount is too low, the system cannot form an emulsion, resulting in an irregular shape of the product.

As a specific embodiment of the present invention, the hydrophilic monomer may be any one of acrylamide, acrylic acid and methacryloxyethyltrimethyl ammonium chloride, but is not limited to these three polymerizable hydrophilic monomers.

As a specific embodiment of the present invention, the molar ratio of the hydrophilic monomer to the styrene should be greater than 1:1, but not exceeding the maximum value of the hydrophilic monomer in the step S3. If the hydrophilic monomer in the system is too low, a proportion of the hydrophilic part in the nanosheet is reduced.

The present invention has the technical effects as follows.

According to the present invention, a choline chloride-urea based deep eutectic solvent containing a hydrophilic monomer is taken as a reaction non-aqueous solvent, and the reaction non-aqueous solvent reacts with a hydrophobic solvent containing a hydrophobic monomer (styrene) for interfacial polymerization at the deep eutectic solvent-oil phase interface. Since the deep eutectic solvent has a large amount of hydrogen bonds, unlike the conventional water-oil interfacial reaction that obtains spherical particles, the deep eutectic solvent-oil phase interfacial polymerization can obtain hollow microspheres, and then the hollow microspheres can be simply and ultrasonically crushed to obtain a sheet-like structure. The present invention has the following advantages:

(1) In the reaction, a block polymer does not need to be prepared in advance, and a hydrophobic monomer and a hydrophilic monomer are physically isolated, so that the prepared amphiphilic nanosheet has a distinct partition and is not easy to agglomeration.
(2) The method is similar to conventional emulsion polymerization, the amphiphilic nanosheet is prepared by a one-step method, and the preparation process is simple.
(3) The product yield is high, the yield in the existing case is greater than 60%, and the mass production is easy.

BRIEF DESCRIPTION OF DRAWINGS

FIG. 1 is an SEM image of an amphiphilic nanosheet in Example 1 according to the present invention, wherein FIG. 2 is an SEM image of an amphiphilic nanosheet in Example 2 according to the present invention, wherein

FIG. 3 is an SEM image of an amphiphilic nanosheet in Example 3 according to the present invention, wherein

FIG. 8 is an SEM-EDS spectrum of an amphiphilic nanosheet in Example 1 according to the present invention, wherein

FIG. 9 is an SEM-EDS spectrum of an amphiphilic nanosheet in Example 2 according to the present invention, wherein

FIG. 10 is an SEM-EDS spectrum of an amphiphilic nanosheet in Example 3 according to the present invention, wherein

DETAILED DESCRIPTION OF EMBODIMENTS

Figure 1A:
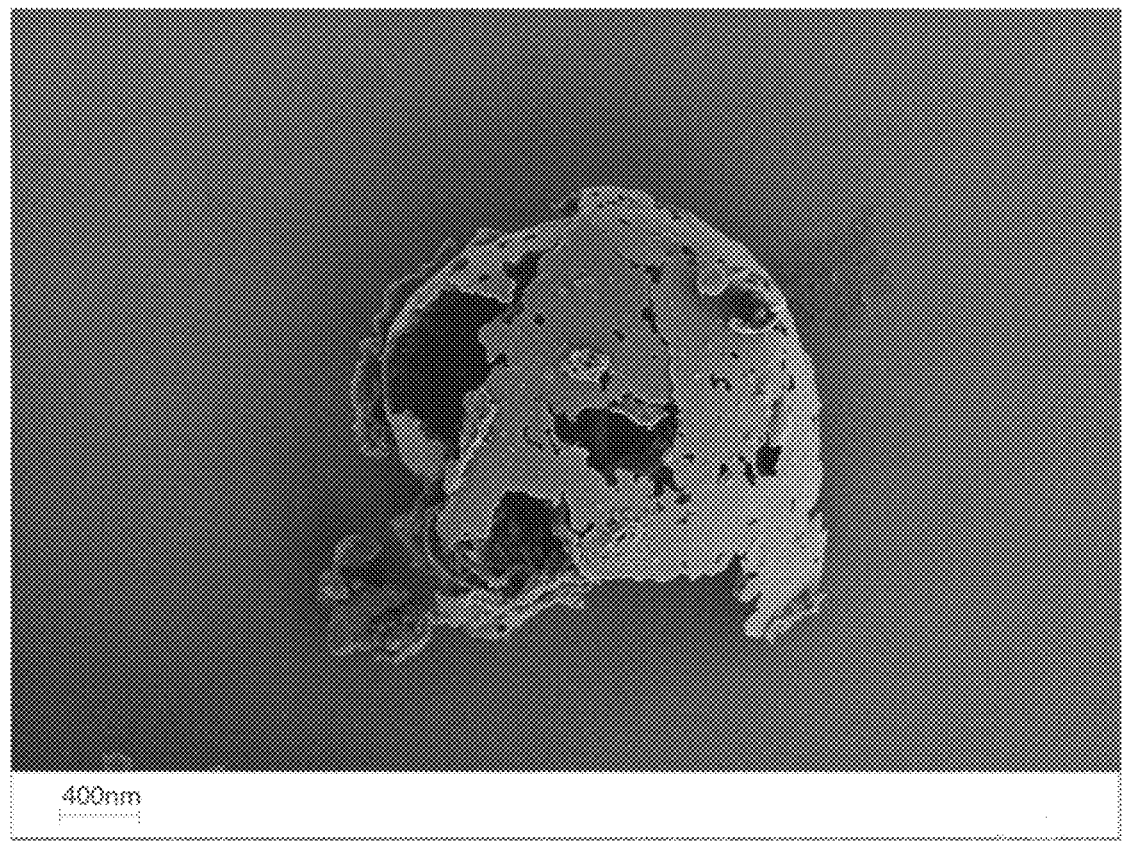
FIG. 1a is a morphology image of a hollow microsphere according to Example 1 before crushing.

The present invention will be further described below with specific examples, but it is not limited thereto. The raw materials used in the examples are conventional raw materials and can be commercially available. Unless otherwise specified, the methods are all conventional technologies.

(I) Product Preparation

Example 1

S1: a mixture of 282.33 g of choline chloride and 242.90 g of urea (with a molar ratio of the choline chloride to the urea of 1:2) was taken and mechanically stirred at 90° C. for 30 min to enable the mixture to be a clear transparent liquid, and then the liquid was cooled to 25° C. to obtain a deep eutectic solvent for later use.

S2: 30.00 g of styrene, 3.00 g of divinylbenzene and 0.33 g of azobisisobutyronitrile (AIBN) were added into 84.46 g of hexadecane, and a mixture was uniformly stirred to obtain an oil phase mixed solution.

S3: 500.00 g of the deep eutectic solvent prepared was taken into a 1000 mL three-necked bottle at 30° C., and then 20.47 g of acrylamide, 0.5 g of cetyltrimethylammonium chloride and the oil phase mixed solution prepared in the S2 were sequentially added. The reaction system was emulsified by mechanical stirring at 1000 rpm for 15 min while nitrogen was introduced for 15 min, and then the reaction system was mechanically stirred at 500 rpm and heated to 70° C. for reaction for 8 h.

After the reaction was completed, 800 mL of distilled water was added, the reaction system was ultrasonically crushed (at a power of 1000 Kw) for 10 min, centrifuged, and then continuously centrifuged (at a rotation speed of 5000 rpm) with 600 mL of petroleum ether and 600 mL of ethanol; and the reaction mixture was dried to obtain 38.92 g of white powder with the mass yield of 72.79%.

Example 2

S1: a mixture of 37.64 g of choline chloride and 24.29 g of urea (with a molar ratio of the choline chloride to the urea of 1:1.5) was magnetically stirred and heated at 80° C. to enable the mixture to be a clear transparent liquid, and then the liquid was cooled to 25° C. to obtain a deep eutectic solvent for later use;

S2: 2.5 g of styrene, 1 g of divinylbenzene and 0.035 g of azobisisobutyronitrile (AIBN) were added into 8.69 g of dodecane, and a mixture was uniformly stirred to obtain an oil phase mixed solution;

S3: 50 g of the deep eutectic solvent prepared in the S1 was taken into a 100 mL three-necked bottle at 30° C., and then 2.00 g of acrylic acid, 0.04 g of cetyltrimethylammonium chloride and the oil phase mixed solution prepared in the S2 were sequentially added. The reaction system was emulsified by mechanical stirring at 1000 rpm for 15 min while nitrogen was introduced for 15 min, and then the reaction system was mechanically stirred at 500 rpm and heated to 70° C. for reaction for 6 h.

After the reaction was completed, 80 mL of distilled water was added, the reaction system was ultrasonically crushed (at a power of 1000 Kw) for 10 min, centrifuged, and then continuously centrifuged (at a rotation speed of 5000 rpm) with 60 mL of petroleum ether and 80 mL of ethanol; and the reaction mixture was dried to obtain 3.52 g of white powder with the mass yield of 64.0%.

Example 3

S1: a mixture of 52.98 g of choline chloride and 56.98 g of urea (with a molar ratio of the choline chloride to the urea of 1:2.5) was magnetically stirred and heated at 70° C. to enable the mixture to be a clear transparent liquid, and then the liquid was cooled to 25° C. to obtain a deep eutectic solvent for later use;

S2: 3.20 g of styrene, 0.32 g of divinylbenzene and 0.035 g of azobisisobutyronitrile (AIBN) were added into 17.94 g of tetradecane, and a mixture was uniformly stirred to obtain an oil phase mixed solution;

S3: 100 g of the deep eutectic solvent prepared in the S1 was taken into a 100 mL three-necked bottle at 30° C., and then 5.98 g of methacryloxyethyltrimethyl ammonium chloride, 0.05 g of cetyltrimethylammonium chloride and the oil phase mixed solution prepared in the S2 were sequentially added. The reaction system was emulsified by mechanical stirring at 1000 rpm for 15 min while nitrogen was introduced for 15 min, and then the reaction system was mechanically stirred at 500 rpm and heated to 70° C. for reaction for 6 h.

After the reaction was completed, 200 mL of distilled water was added, the reaction system was ultrasonically crushed (at a power of 1000 Kw) for 10 min, centrifuged, and then continuously centrifuged (at a rotation speed of 5000 rpm) with 180 mL of petroleum ether and 180 mL of ethanol; and the reaction mixture was dried to obtain 8.6 g of white powder with the mass yield of 68.36%.

Comparative Example 1

S1: a mixture of 28.23 g of choline chloride and 24.29 g of urea (with a molar ratio of the choline chloride to the urea of 1:2) was taken and mechanically stirred at 90° C. for 30 min to enable the mixture to be a clear transparent liquid, and then the liquid was cooled to 25° C. to obtain a deep eutectic solvent for later use.

S2: 3.00 g of styrene, 0.15 g of divinylbenzene and 0.031 g of azobisisobutyronitrile (AIBN) were added into 8.45 g of hexadecane, and a mixture was uniformly stirred to obtain an oil phase mixed solution.

S3: 50.0 g of the deep eutectic solvent prepared was taken into a 100 mL three-necked bottle at 30° C., and then 2.04 g of acrylamide, 0.050 g of cetyltrimethylammonium chloride and the oil phase mixed solution prepared in the S2 were sequentially added. The reaction system was emulsified by mechanical stirring at 1000 rpm for 15 min while nitrogen was introduced for 15 min, and then the reaction system was mechanically stirred at 500 rpm and heated to 70° C. for reaction for 8 h.

After the reaction was completed, 80 mL of distilled water was added, the reaction system was ultrasonically crushed (at a power of 1000 Kw) for 10 min, centrifuged, and then continuously centrifuged (at a rotation speed of 5000 rpm) with 60 mL of petroleum ether and 60 mL of ethanol; and the reaction mixture was dried to obtain 3.61 g of white powder with the mass yield of 69.56%.

Comparative Example 2

S1: a mixture of 28.23 g of choline chloride and 24.29 g of urea (with a molar ratio of the choline chloride to the urea of 1:2) was taken and mechanically stirred at 90° C. for 30 min to enable the mixture to be a clear transparent liquid, and then the liquid was cooled to 25° C. to obtain a deep eutectic solvent for later use.

S2: 3.74 g of styrene, 0.37 g of divinylbenzene and 0.040 g of azobisisobutyronitrile (AIBN) were added into 6.99 g of hexadecane, and a mixture was uniformly stirred to obtain an oil phase mixed solution.

S3: 50.0 g of the deep eutectic solvent prepared was taken into a 100 mL three-necked bottle at 30° C., and then 2.58 g of acrylamide, 0.050 g of cetyltrimethylammonium chloride and the oil phase mixed solution prepared in the S2 were sequentially added. The reaction system was emulsified by mechanical stirring at 1000 rpm for 5 min while nitrogen was introduced for 15 min, and then the reaction system was mechanically stirred at 500 rpm and heated to 70° C. for reaction for 8 h.

After the reaction was completed, 80 mL of distilled water was added, the reaction system was ultrasonically crushed (at a power of 1000 Kw) for 10 min, centrifuged, and then continuously centrifuged (at a rotation speed of 5000 rpm)

with 60 mL of petroleum ether and 60 mL of ethanol; and the reaction mixture was dried to obtain 4.51 g of white powder with the mass yield of 67.41%.

Comparative Example 3

S1: a mixture of 28.23 g of choline chloride and 24.29 g of urea (with a molar ratio of the choline chloride to the urea of 1:2) was taken and mechanically stirred at 90° C. for 30 min to enable the mixture to be a clear transparent liquid, and then the liquid was cooled to 25° C. to obtain a deep eutectic solvent for later use.

S2: 3.00 g of styrene, 0.3 g of divinylbenzene and 0.035 g of azobisisobutyronitrile (AIBN) were added into 8.45 g of hexadecane, and a mixture was uniformly stirred to obtain an oil phase mixed solution.

S3: 50.0 g of the deep eutectic solvent prepared was taken into a 100 mL three-necked bottle at 30° C., and then 2.04 g of acrylamide, 0.065 g of cetyltrimethylammonium chloride and the oil phase mixed solution prepared in the S2 were sequentially added. The reaction system was emulsified by mechanical stirring at 1000 rpm for 15 min while nitrogen was introduced for 15 min, and then the reaction system was mechanically stirred at 500 rpm and heated to 70° C. for reaction for 8 h.

After the reaction was completed, 80 mL of distilled water was added, the reaction system was ultrasonically crushed (at a power of 1000 Kw) for 10 min, centrifuged, and then continuously centrifuged (at a rotation speed of 5000 rpm) with 60 mL of petroleum ether and 60 mL of ethanol; and the reaction mixture was dried to obtain 4.01 g of white powder with the mass yield of 75.09%.

Comparative Example 4

S1: a mixture of 28.23 g of choline chloride and 24.29 g of urea (with a molar ratio of the choline chloride to the urea of 1:2) was taken and mechanically stirred at 90° C. for 30 min to enable the mixture to be a clear transparent liquid, and then the liquid was cooled to 25° C. to obtain a deep eutectic solvent for later use.

S2: 3.00 g of styrene, 0.5 g of divinylbenzene and 0.035 g of azobisisobutyronitrile (AIBN) were added into 8.45 g of hexadecane, and a mixture was uniformly stirred to obtain an oil phase mixed solution.

S3: 50.0 g of the deep eutectic solvent prepared was taken into a 100 mL three-necked bottle at 30° C., and then 2.04 g of acrylamide, 0.02 g of cetyltrimethylammonium chloride and the oil phase mixed solution prepared in the S2 were sequentially added. The reaction system was emulsified by mechanical stirring at 1000 rpm for 15 min while nitrogen was introduced for 15 min, and then the reaction system was mechanically stirred at 500 rpm and heated to 70° C. for reaction for 8 h.

After the reaction was completed, 80 mL of distilled water was added, the reaction system was ultrasonically crushed (at a power of 1000 Kw) for 10 min, centrifuged, and then continuously centrifuged (at a rotation speed of 5000 rpm) with 60 mL of petroleum ether and 60 mL of ethanol; and the reaction mixture was dried to obtain 2.54 g of white powder with the mass yield of 45.84%.

(II) Product Performance Tests

SEM Test

The products in Examples 1 to 3 and Comparative Examples 1 to 4 were tested by a scanning electron microscope (SEM, Gemini 300, Zeiss, Germany), and the final test results are shown in FIGS. 1 to 7.

Figure 1B:
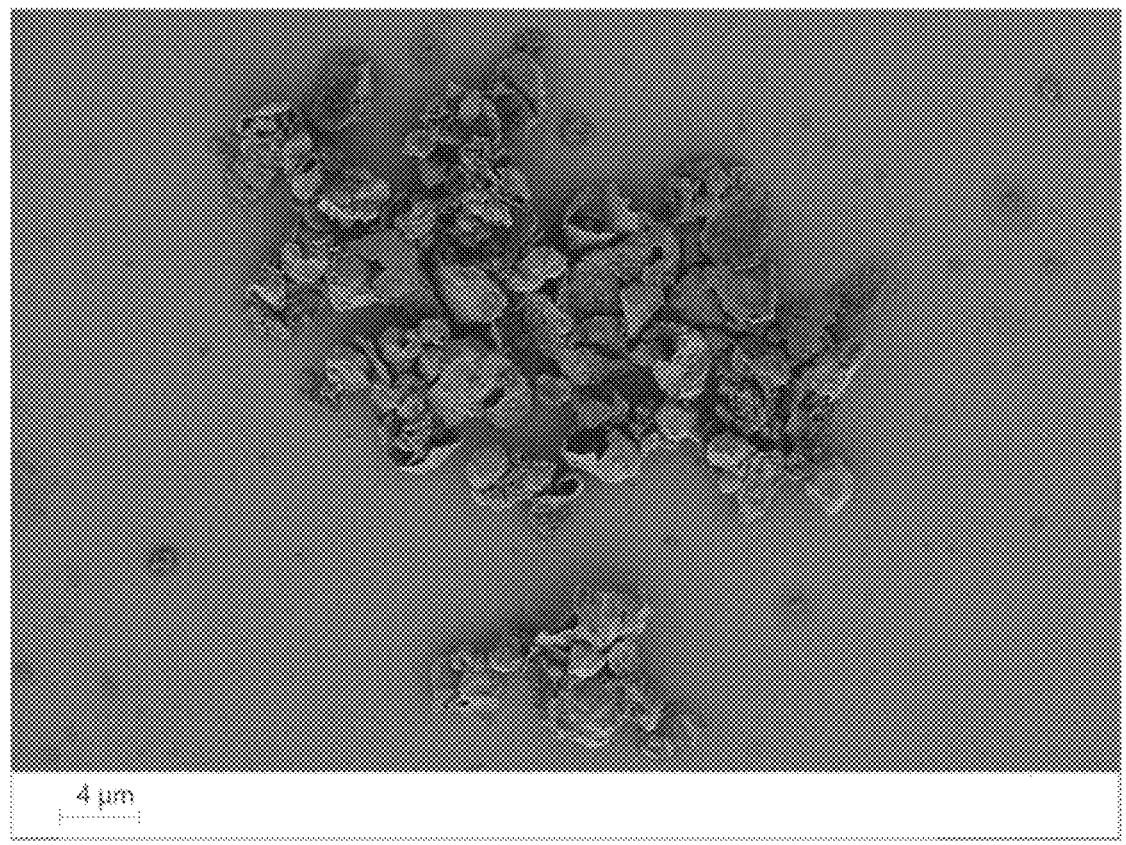
FIGS. 1b and 1c are morphology images of a sheet-like product according to Example 1 after crushing.
Figure 1C:
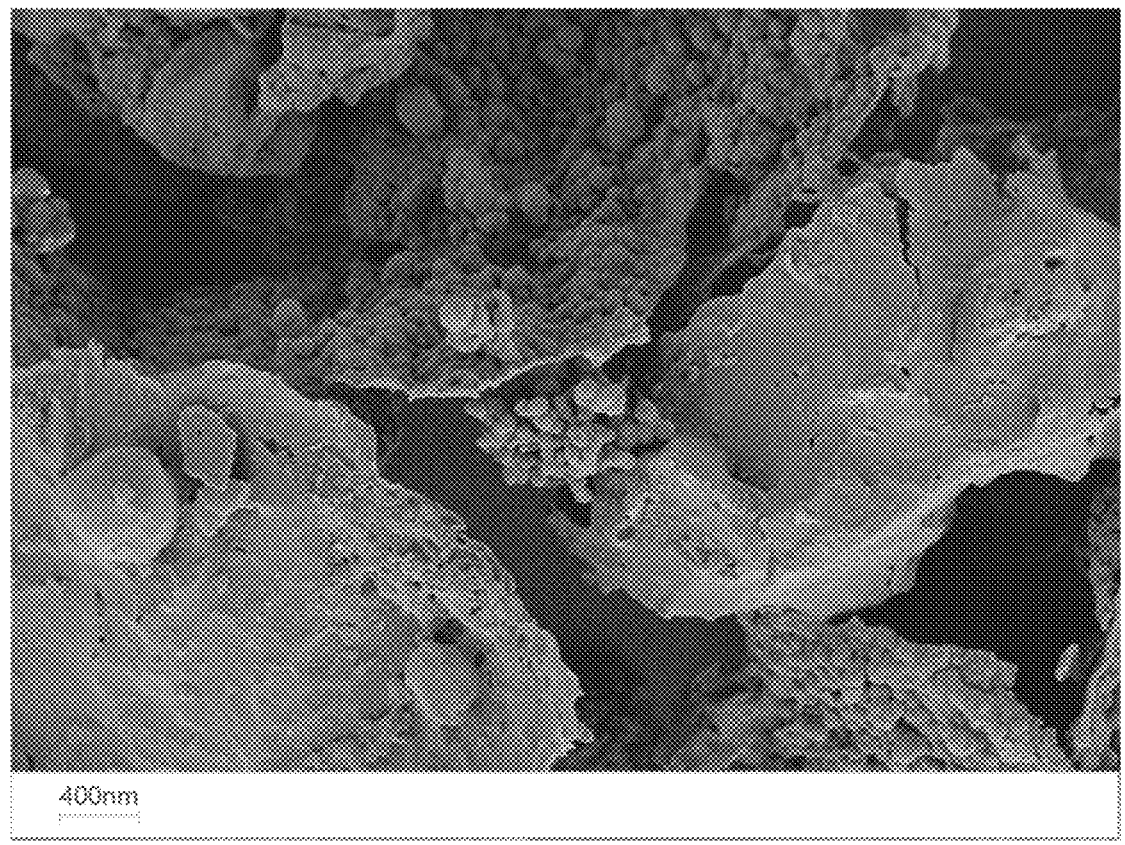
Figure 2A:
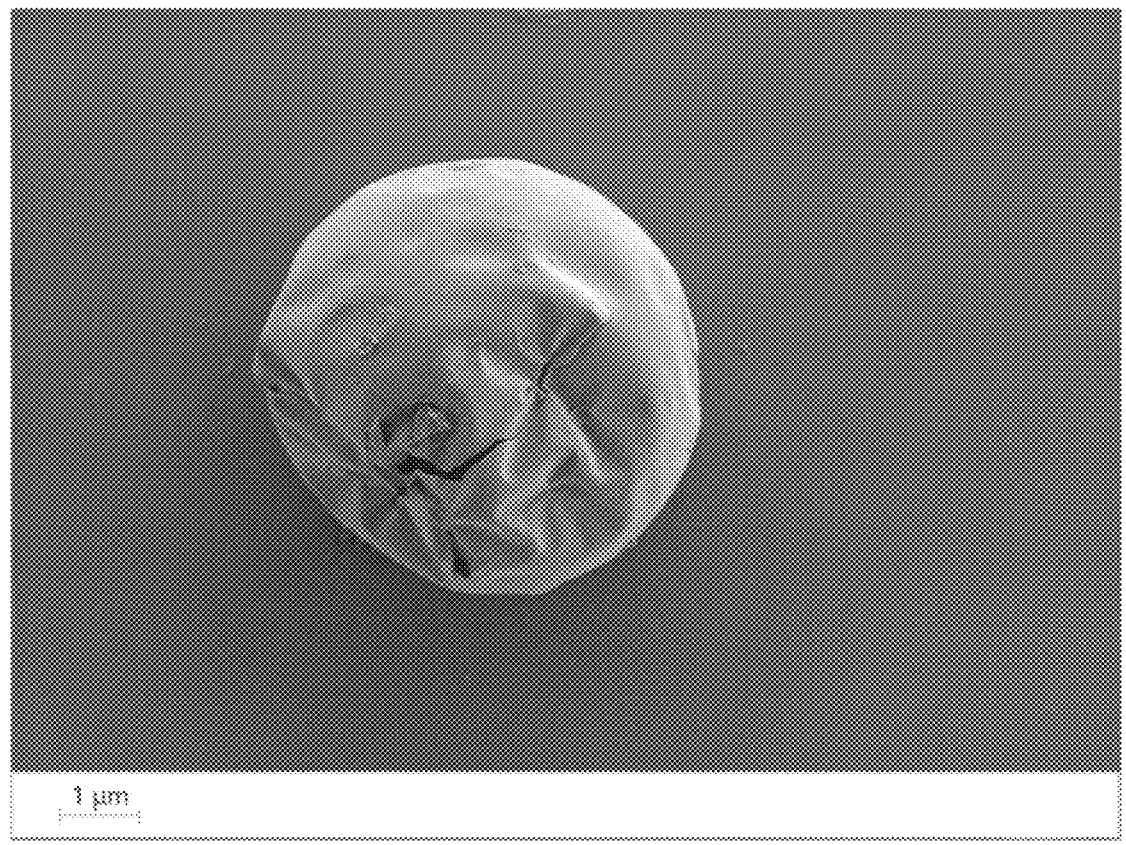
FIG. 2a is a morphology image of a hollow microsphere according to Example 2 before crushing.
Figure 2B:
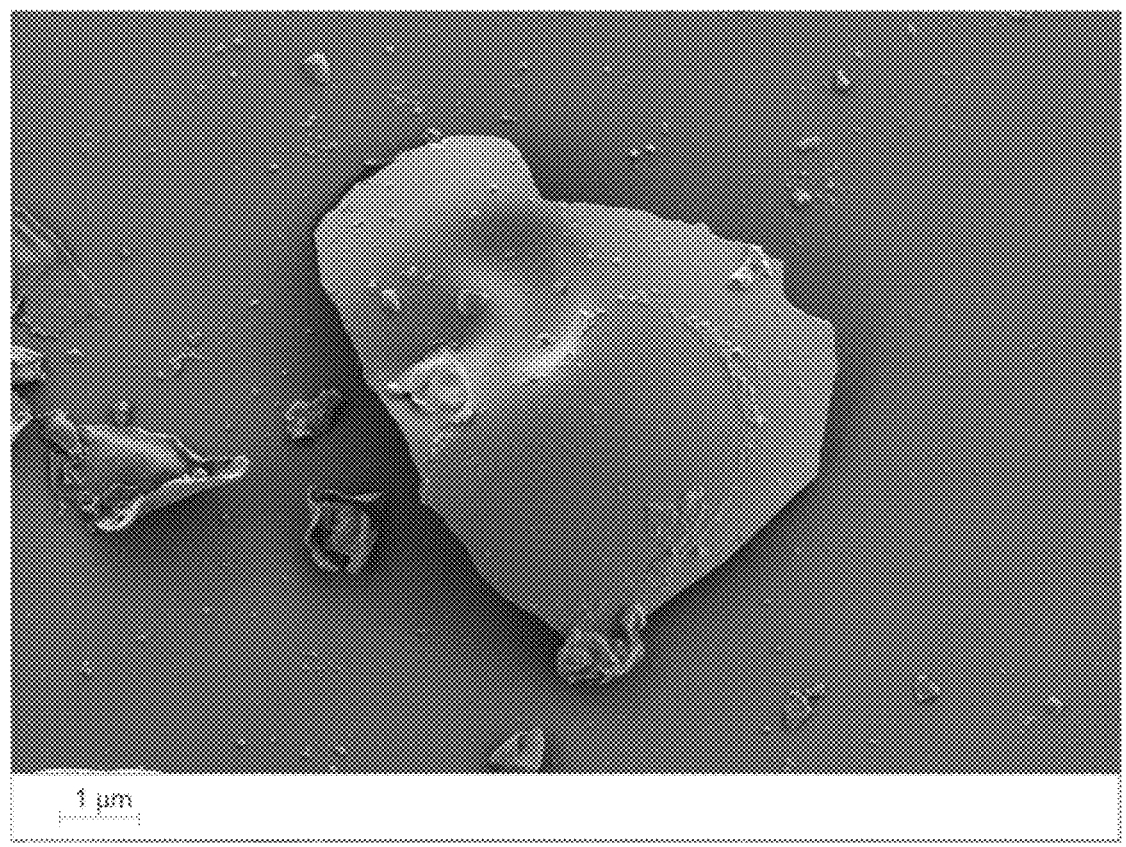
FIGS. 2b and 2c are morphology images of a sheet-like product according to Example 2 after crushing.
Figure 2C:
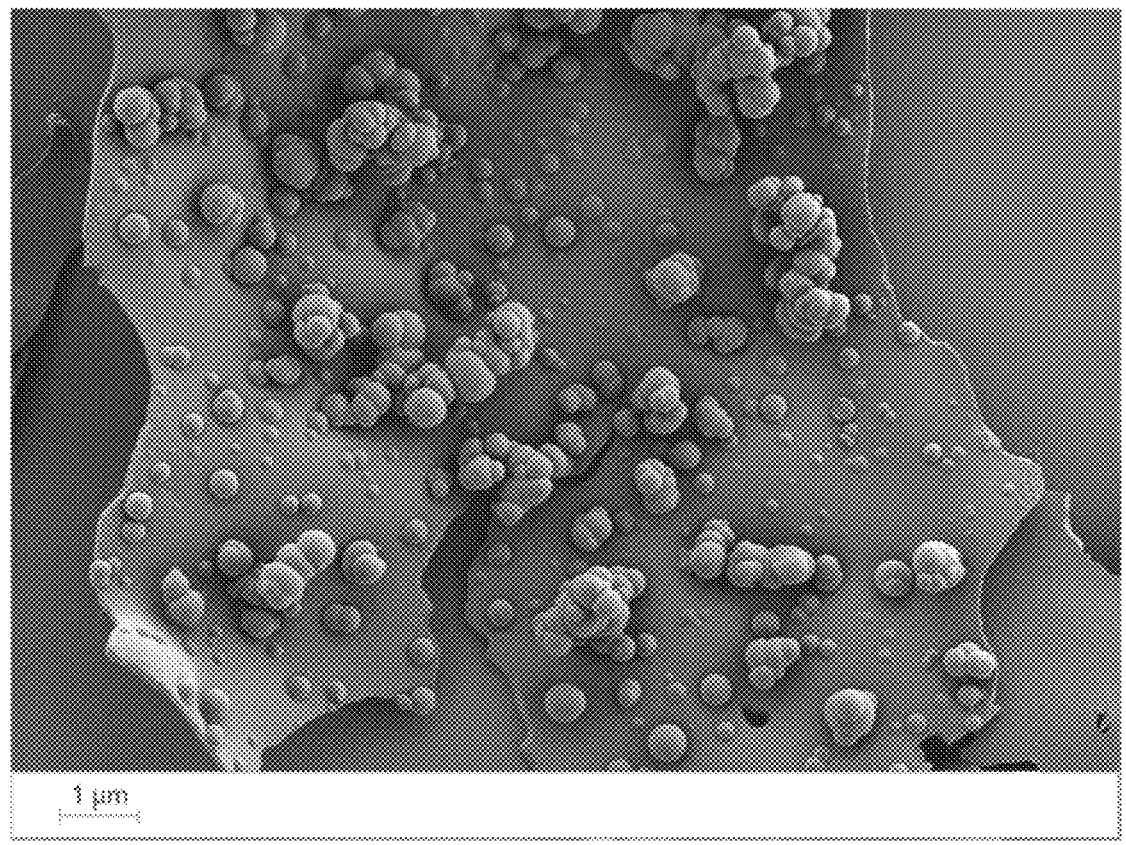
Figure 3A:
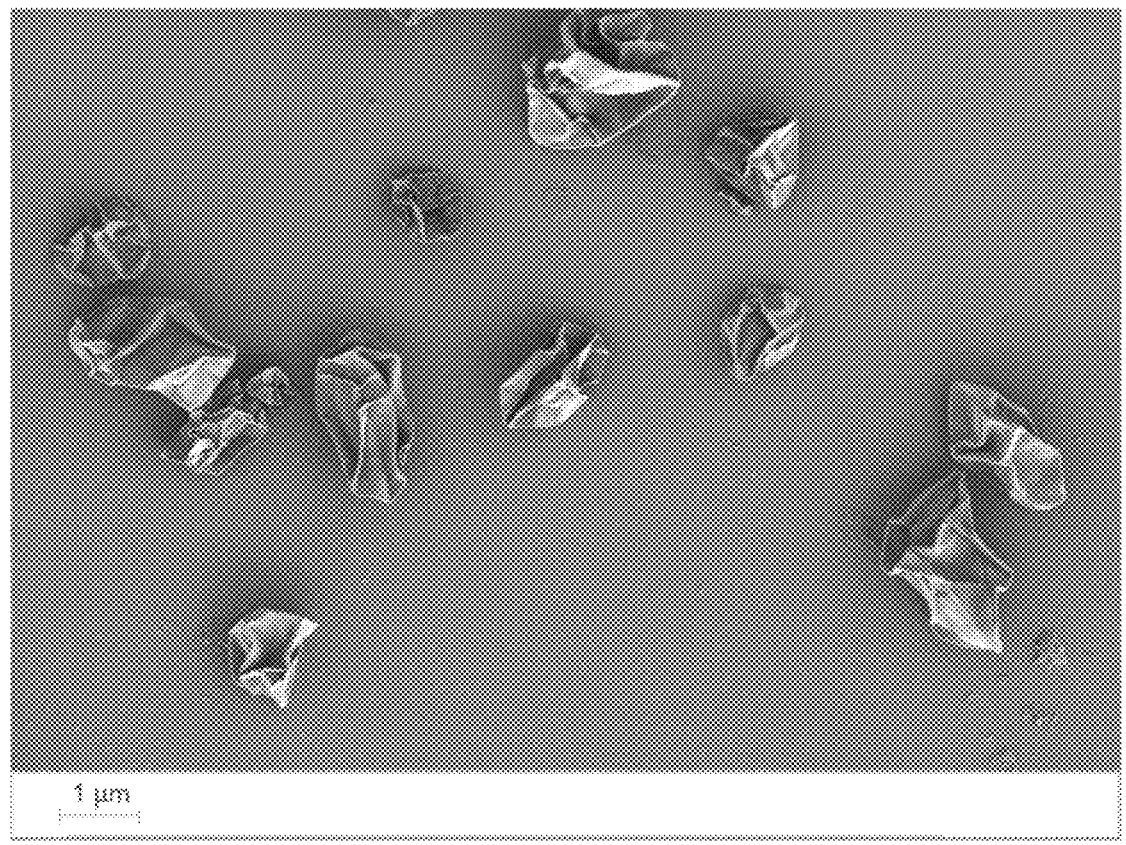
FIG. 3a is a morphology image of a hollow microsphere according to Example 3 before crushing.
Figure 3B:
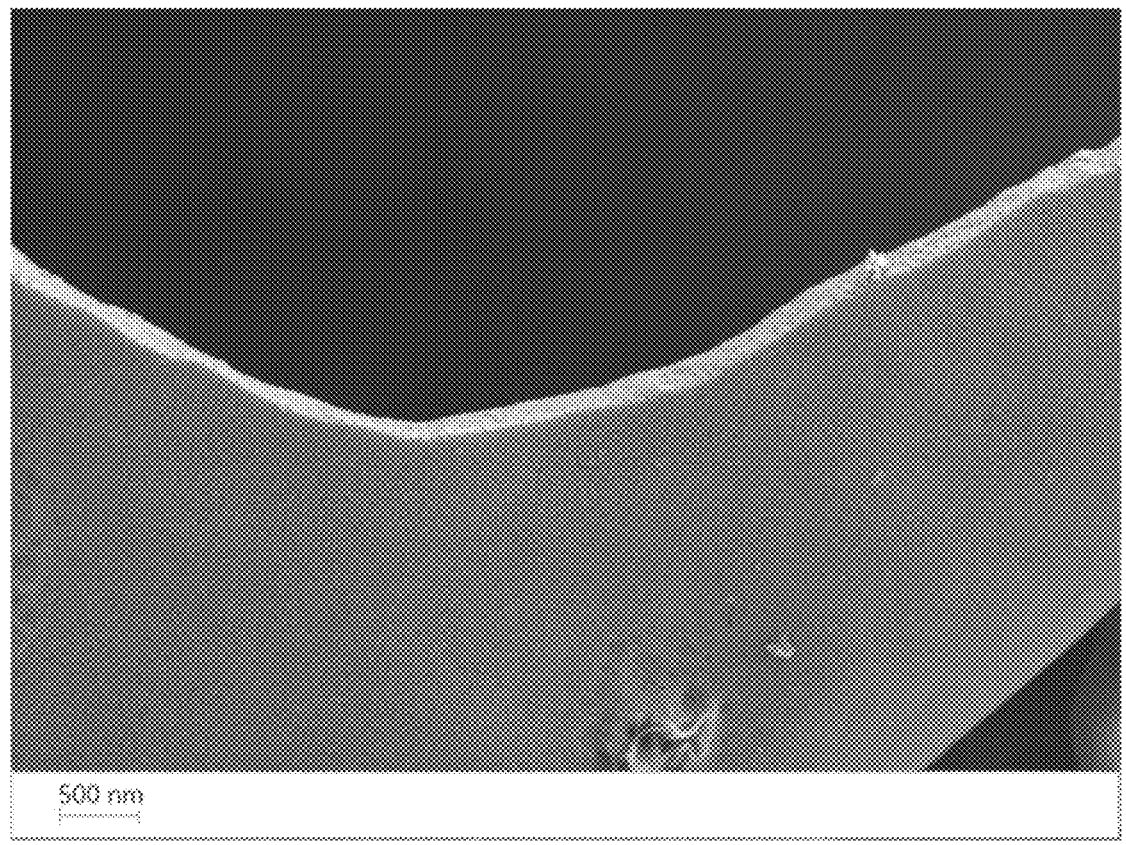
FIGS. 3b and 3c are morphology images of a sheet-like product according to Example 3 after crushing.
Figure 3C:
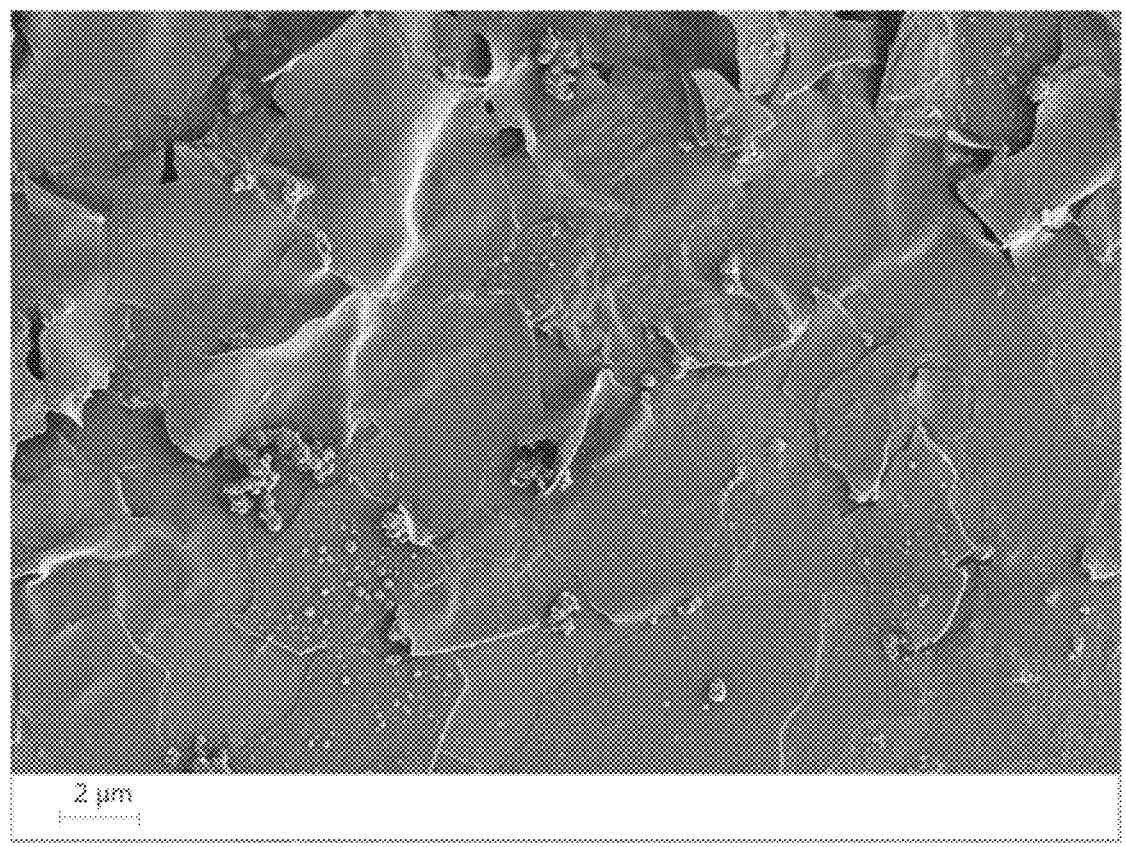

FIGS. 1 to 3 are SEM images of products in Examples 1 to 3, wherein FIGS. 1a, 2a and 3a are morphology diagrams of hollow microspheres of the products in Examples 1 to 3 before crushing, FIGS. 1b and 1c are morphology diagrams of sheet-like products in Example 1 after crushing, FIGS. 2b and 2c are morphology diagrams of sheet-like products in Example 2 after crushing, and FIGS. 3b and 3c are morphology diagrams of sheet-like products in Example 3 after crushing. It can be seen from the figures that the solid morphologies prepared in Examples 1 to 3 are all sheet-like, and in two sides of the sheet-like morphologies, one side is a smooth surface, and the other side is a rough small spherical surface.

Figure 4:
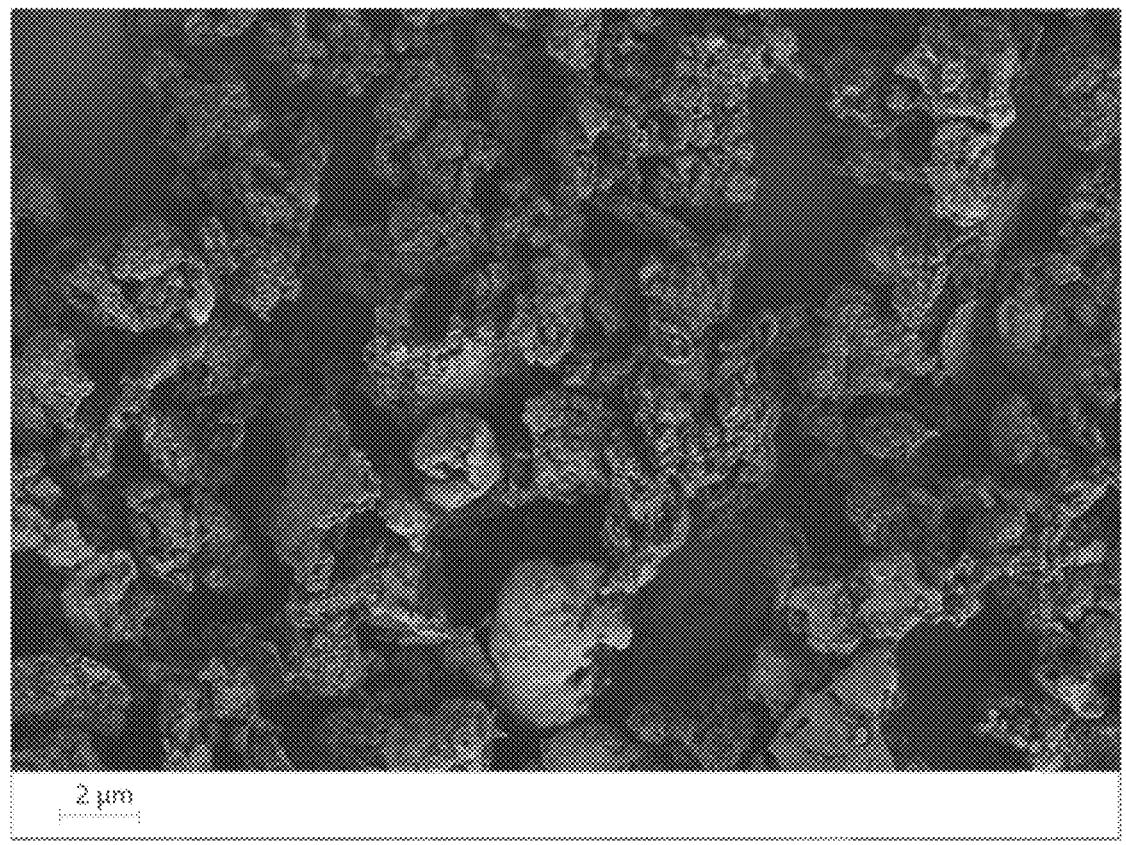
FIG. 4 is an SEM image of a product in Comparative Example 1 according to the present invention.

FIG. 4 is an SEM image of a product in Comparative Example 1. It can be seen from the image that this product is not sheet-like. The mass ratio of divinylbenzene to styrene (5%) in this Comparative Example was reduced relative to Example 1, which reduced a deposition rate of styrene monomer in hexadecane, resulting in a thickening film, and no amphiphilic nanosheets were obtained.

Figure 5:
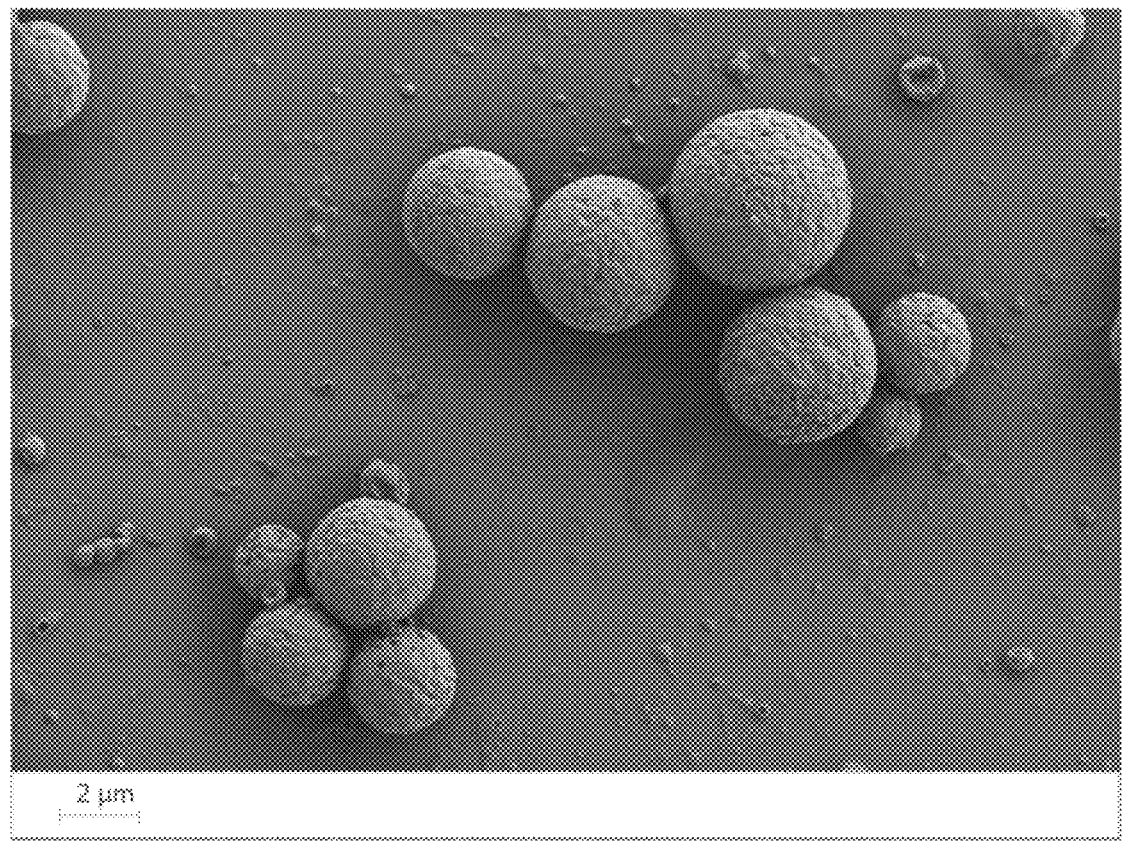
FIG. 5 is an SEM image of a product in Comparative Example 2 according to the present invention.

FIG. 5 is an SEM image of a product in Comparative Example 2. It can be seen from the image that the obtained solid is spherical and cannot be crushed by ultrasound later. This is due to the large usage amount of hydrophobic monomers (the volume ratio of styrene to hydrophobic monomers is close to 1:2).

Figure 6:
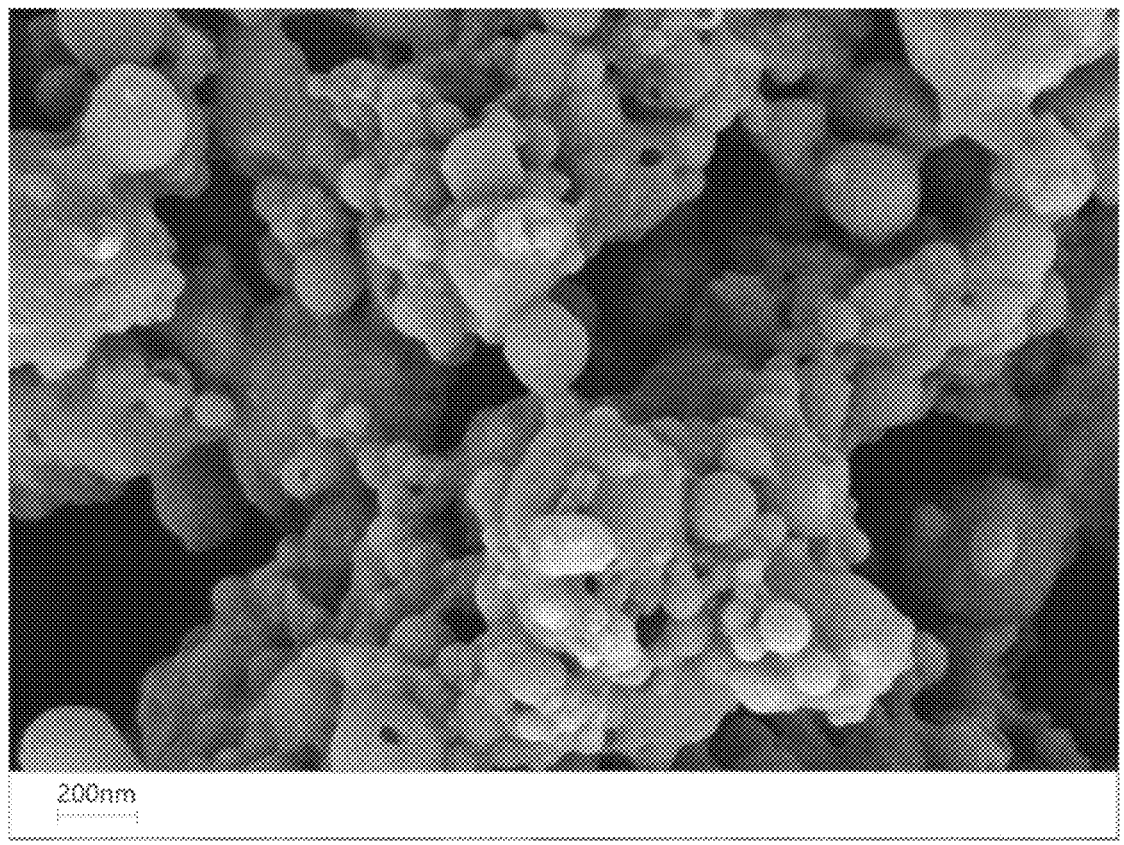
FIG. 6 is an SEM image of a product in Comparative Example 3 according to the present invention.

FIG. 6 is an SEM image of a product in Comparative Example 3. It can be seen from the image that since the usage amount of cetyltrimethylammonium chloride was 0.13% by mass of the deep eutectic solvent, if the usage amount is too high, the droplets of the reaction system were not easily aggregated, and the obtained product was aggregated pellets of about 100 nm.

Figure 7:
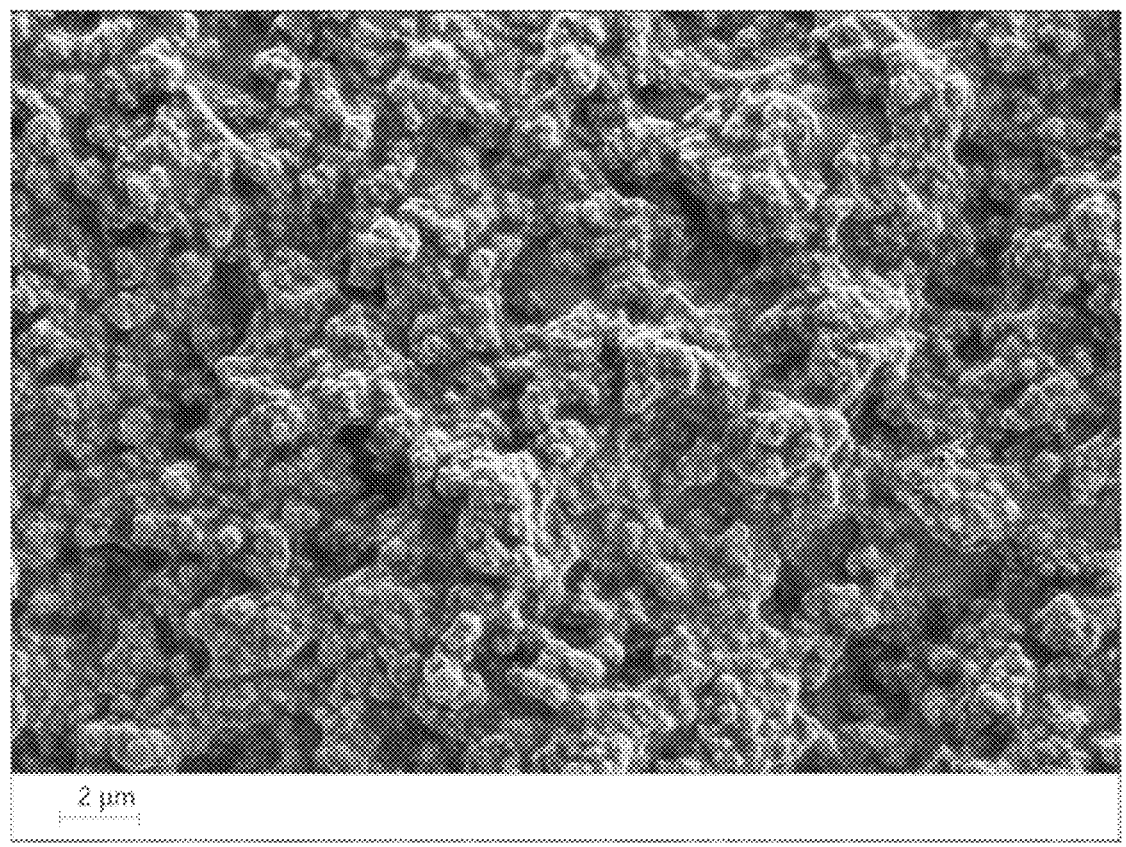
FIG. 7 is an SEM image of a product in Comparative Example 4 according to the present invention.

FIG. 7 is an SEM image of a product in Comparative Example 4. It can be seen from the image that since the usage amount of cetyltrimethylammonium chloride was 0.04% by mass of the deep eutectic solvent, if the usage amount is too low, the emulsion is unstable, and the obtained product has an irregular shape.

SEM-EDS Test

The amphiphilic nanosheets prepared in Examples 1 to 3 were tested by a scanning electron microscope (SEM-EDX, Gemini 300, Zeiss, Germany), and the test results are shown in FIGS. 8 to 10 and Tables 1 to 3.

TABLE 1

Element content analysis of EDS spot-scanned sample in Example 1

Figure 8A:
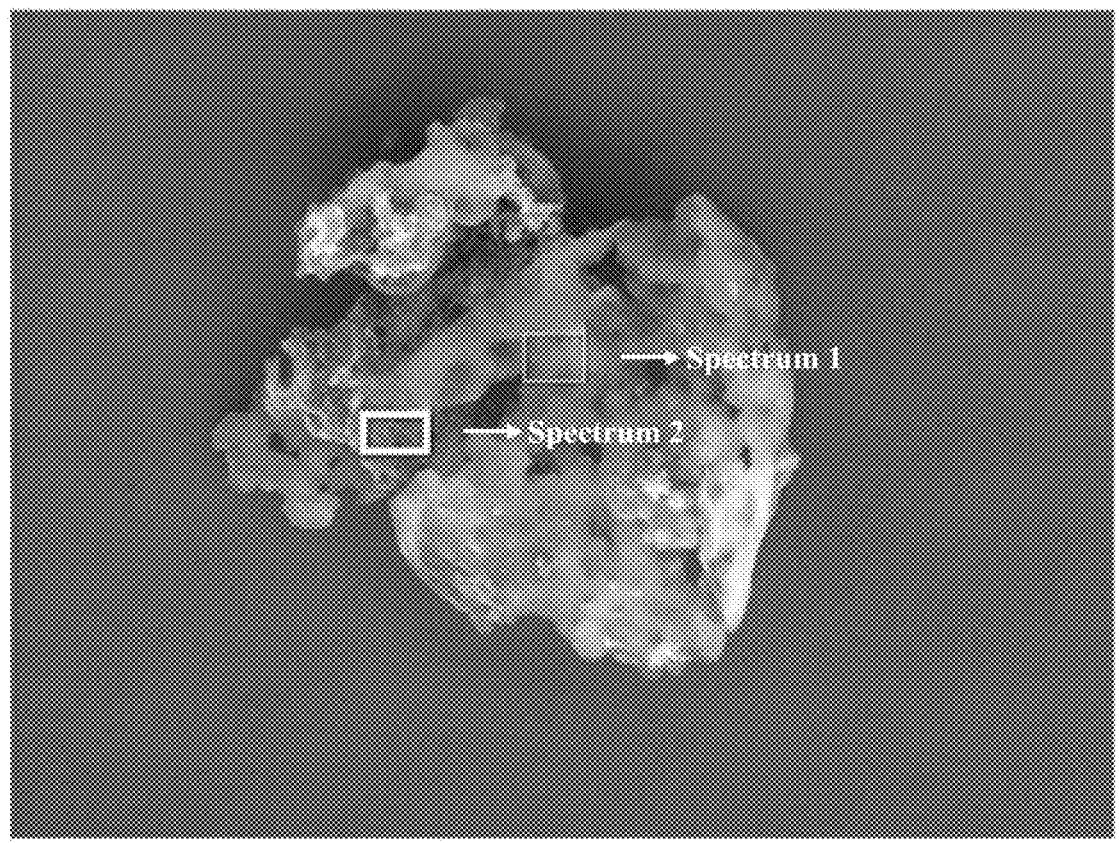
FIG. 8a shows a spot scanning of energy spectrum of Example 1.

| Spectrum 1 in FIG. 8a | | | | |
| --- | --- | --- | --- | --- |
| Element | Line types | Weight percentage | Wt % Sigma | Atomic percent |
| N | K-Line series | 1.51 | 3.42 | 1.24 |
| O | K-Line series | 5.21 | 0.63 | 3.90 |
| C | K-Line series | 93.28 | 0.63 | 94.86 |
| Total amount | | 100.00 | | 100.00 |

TABLE 1-continued

Element content analysis of EDS spot-scanned sample in Example 1

Spectrum 2 in FIG. 8a

| Element | Line types | Weight percentage | Wt % Sigma | Atomic percent |
|---|---|---|---|---|
| N | K-Line series | 0.00 | 5.48 | 0.00 |
| O | K-Line series | 1.71 | 1.03 | 1.33 |
| C | K-Line series | 98.29 | 1.03 | 98.67 |
| Total amount | | 100.00 | | 100.00 |

Figure 8B:
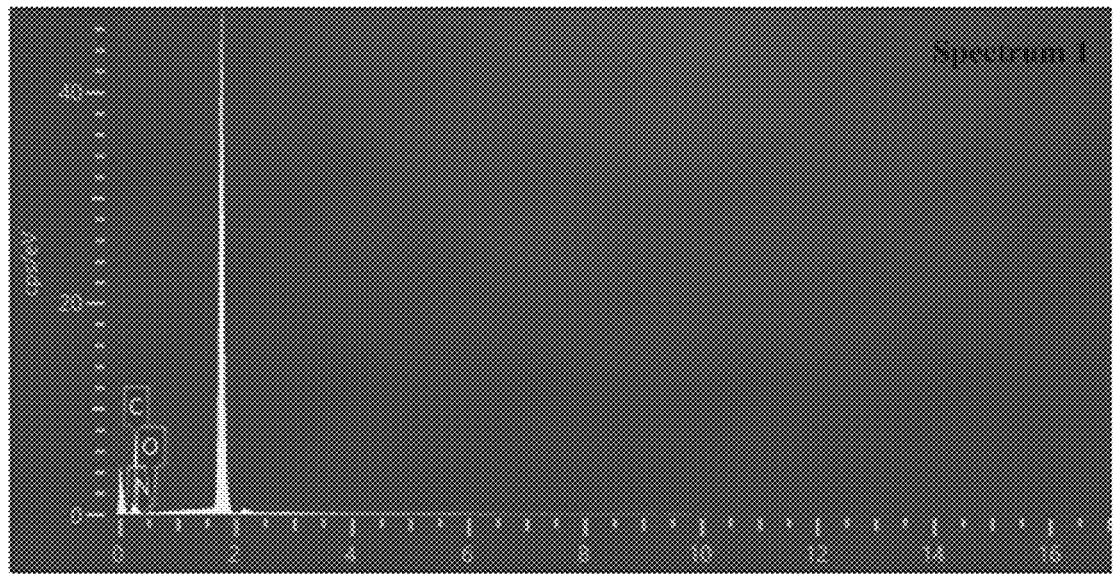
FIG. 8b is a diagram of elements proportion analysis in a sample obtained by spot-scanning energy spectrum of a smooth surface in Example 1.
Figure 8C:
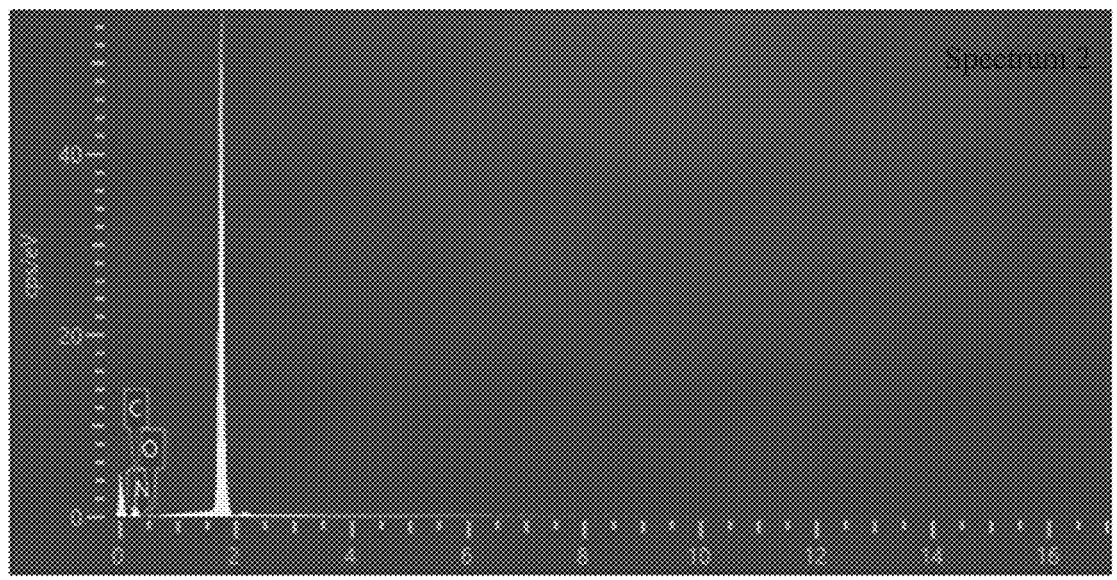
FIG. 8c is a diagram of elements proportion analysis in a sample obtained by spot scanning energy spectrum of a rough small spherical surface in Example 1.

FIG. 8 is an SEM-EDS spectrum of Example 1, wherein FIG. 8a shows a spot scanning of energy spectrum of Example 1, FIG. 8b is a diagram of elements proportion analysis in a sample obtained by spot-scanning EDS spectrum of a smooth surface in Example 1, and FIG. 8c is a diagram of elements proportion analysis in a sample obtained by spot-scanning EDS spectrum of a rough small spherical surface in Example 1. Table 1 is the element content analysis of EDS spot-scanned sample in Example 1. It can be seen from the SEM-EDX test that FIG. 8b shows a spot scanning at the spectrum 1 of the smooth surface, in which the mass fractions of nitrogen and oxygen are 5.21% and 1.51%. This indicates that polyacrylamide exists in the smooth surface and is represented by hydrophilic characteristics. FIG. 8c shows a spot scanning at the spectrum 2 of the rough spherical surface, in which the mass fractions of nitrogen and oxygen are 1.71% and 0%. This indicates that there is no polyacrylamide component on the inner surface, and only polystyrene exists and is represented by hydrophobic characteristics. It indicates that the prepared amphiphilic nanosheet has a distinct partition, in which the rough small spherical surface is polystyrene, and the polyacrylamide exists only on the smooth surface.

TABLE 2

Element content analysis of EDS spot-scanned sample in Example 2

Figure 9A:
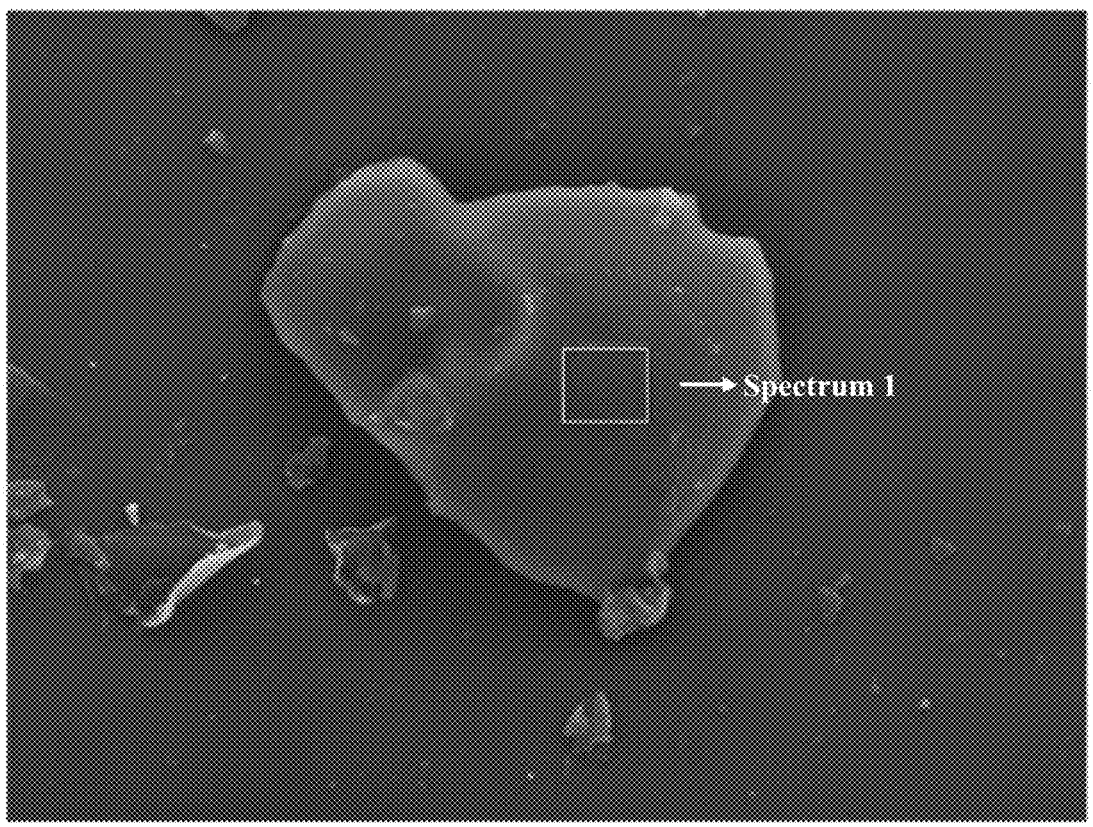
FIG. 9a shows a spot scanning of energy spectrum of Example 2.

Spectrum 1 in FIG. 9a

| Element | Line types | Weight percentage | Wt % Sigma | Atomic percent |
|---|---|---|---|---|
| N | K-Line series | 0.58 | 4.50 | 0.64 |
| O | K-Line series | 13.83 | 1.09 | 10.81 |
| C | K-Line series | 84.59 | 4.14 | 88.55 |
| Total amount | | 100.00 | | 100.00 |

Figure 9B:
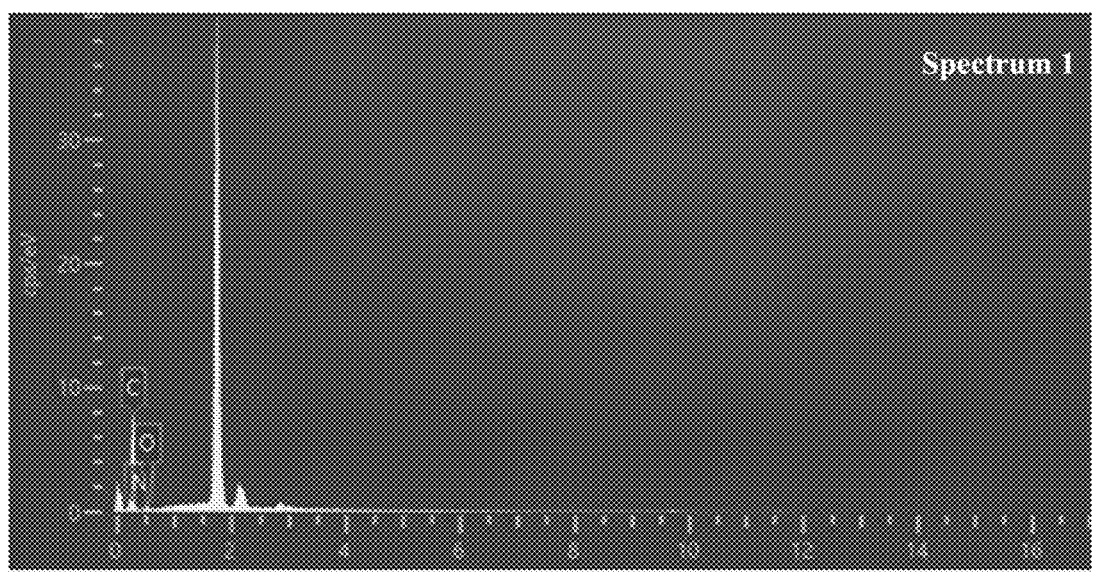
FIG. 9b is a diagram of elements proportion analysis in a sample obtained by spot scanning energy spectrum of a smooth surface in Example 2.

FIG. 9 is an SEM-EDS spectrum of Example 2, wherein FIG. 9a shows a spot scanning of EDS spectrum of Example 2, and FIG. 9b is a diagram of elements proportion analysis in a sample obtained by spot-scanning EDS spectrum of a smooth surface in Example 2. Table 2 is the element content analysis of EDS spot-scanned sample in Example 2. It can be seen from SEM-EDX test that the mass fraction of the O element is 13.83%, which indicates that polyacrylic acid exists in the smooth surface and is represented by hydrophilic characteristics, and the rough small spherical surface also has no hydrophilic component as in Example 1. Therefore, the polystyrene-polyacrylic acid nanosheet with a distinct partition is prepared.

TABLE 3

Element content analysis of EDS spot-scanned sample in Example 3

Figure 10A:
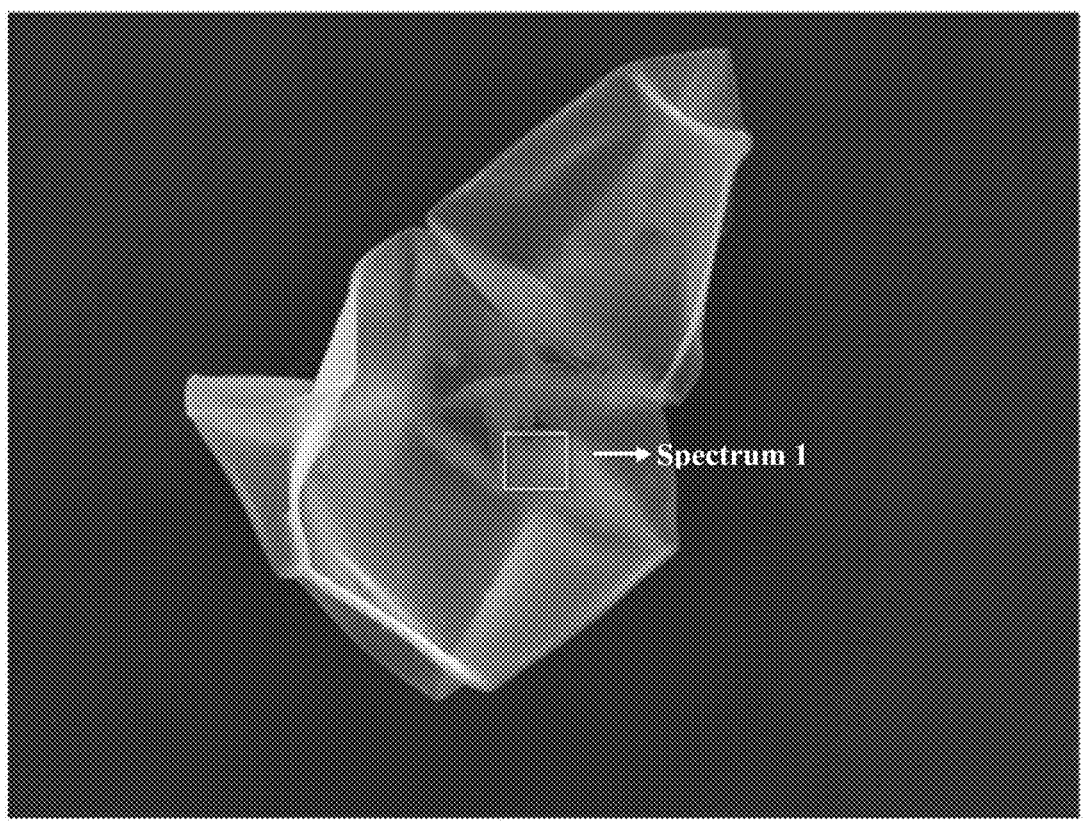
FIG. 10a shows a spot scanning of energy spectrum of Example 3.

Spectrum 1 in FIG. 10a

| Element | Line types | Weight percentage | Wt % Sigma | Atomic percent |
|---|---|---|---|---|
| N | K-Line series | 10.48 | 2.67 | 9.43 |
| O | K-Line series | 12.66 | 0.76 | 9.97 |
| C | K-Line series | 76.86 | 2.37 | 80.60 |
| Total amount | | 100.00 | | 100.00 |

Figure 10B:
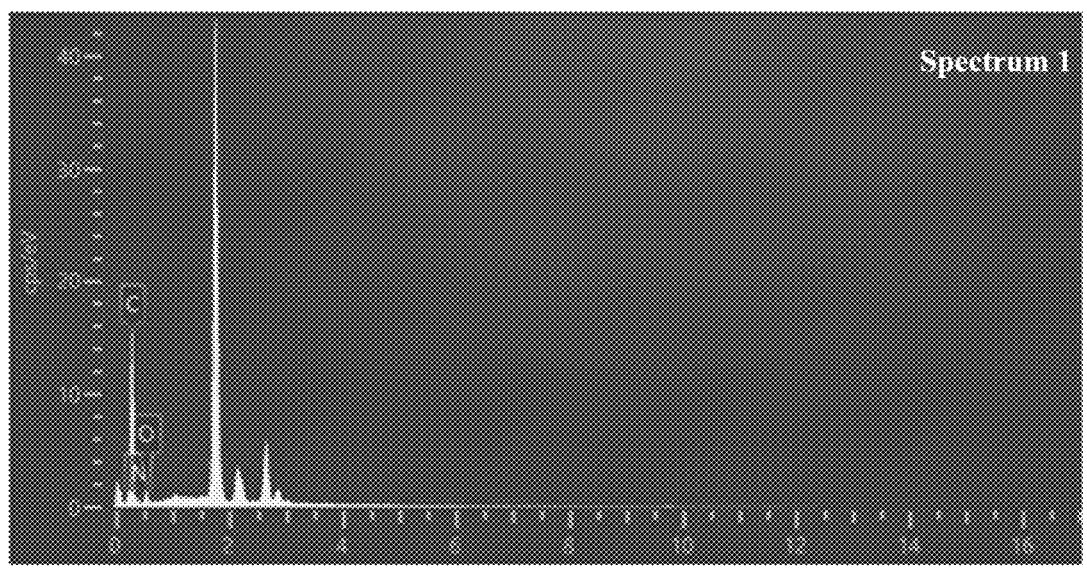
FIG. 10b is a diagram of elements proportion analysis in a sample obtained by spot scanning energy spectrum of a smooth surface in Example 3.

FIG. 10 is an SEM-EDS spectrum of Example 3, wherein FIG. 10a shows a spot scanning of EDS spectrum of Example 3, and FIG. 10b is a diagram of elements proportion analysis in a sample obtained by spot-scanning EDS spectrum of a smooth surface in Example 3. Table 3 is the element content analysis of EDS spot-scanned sample in Example 3. It can be seen from SEM-EDX test that the mass fractions of O element and N element are 12.66% and 10.48%. This indicates that poly(methacryloyloxyethyl trimethyl ammonium chloride) exists in the smooth surface and is represented by hydrophilic characteristics. The rough small spherical surface also has no hydrophilic component as in Example 1. Therefore, the polystyrene-poly(methacryloyloxyethyl trimethyl ammonium chloride) nanosheet with a distinct partition is prepared.

FT-IR Spectrum Test

Figure 12:
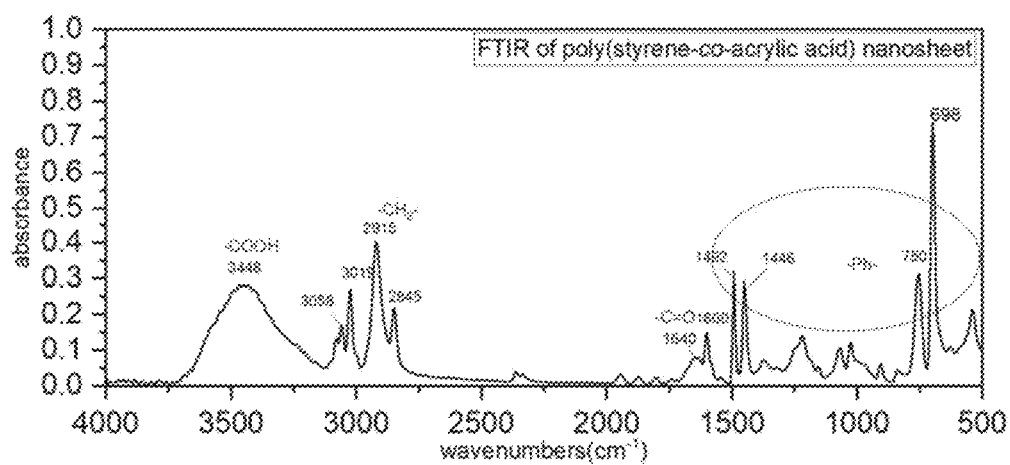
FIG. 12 is a Fourier transform infrared spectrogram of an amphiphilic nanosheet in Example 2 according to the present invention.
Figure 13:
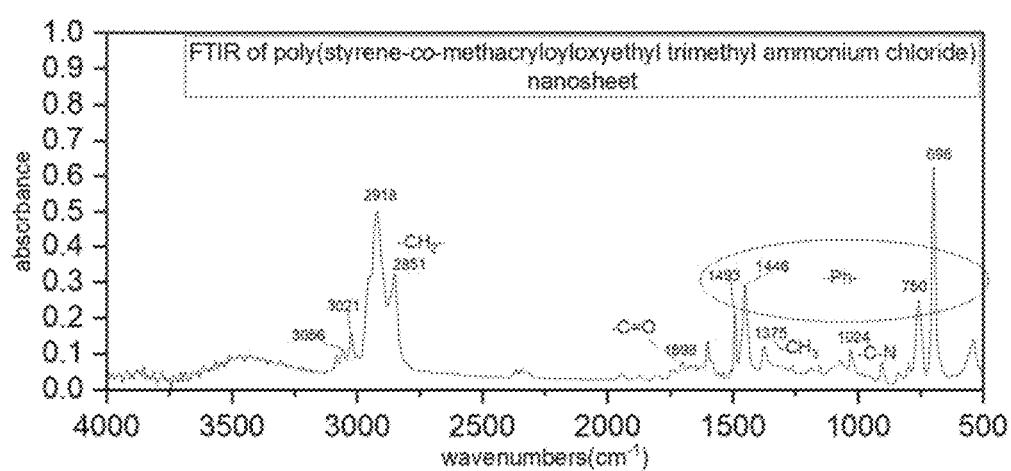
FIG. 13 is a Fourier transform infrared spectrogram of an amphiphilic nanosheet in Example 3 according to the present invention.

The amphiphilic nanosheets prepared in Examples 1 to 3 were tested by a Fourier transform infrared spectrometer (FT-IR, WQF-520, Beifen-Ruili, China), and the final test results are shown in FIGS. 12 and 13.

Figure 11:
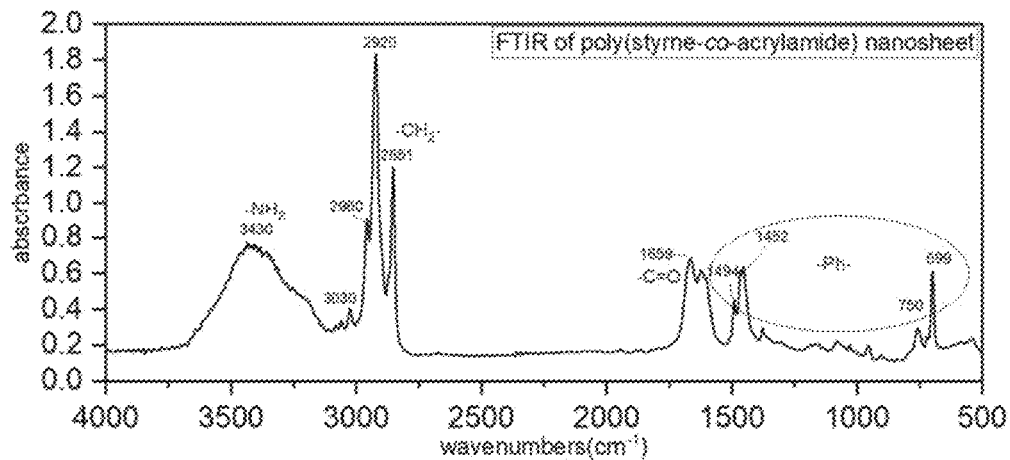
FIG. 11 is a Fourier transform infrared spectrogram of an amphiphilic nanosheet in Example 1 according to the present invention.

FIG. 11 is a Fourier transform infrared spectrogram of Example 1, in which 3430 $cm^{-1}$ is a characteristic absorption peak of —$NH_2$ in an amide group, 1659 $cm^{-1}$ is a characteristic absorption peak of the amide group, 3030 $cm^{-1}$, 2960 $cm^{-1}$, 2920 $cm^{-1}$ and 2851 $cm^{-1}$ are characteristic absorption peaks of —$CH_2$— in a polymer main chain, and 1494 $cm^{-1}$, 1452 $cm^{-1}$, 750 $cm^{-1}$ and 699 $cm^{-1}$ are characteristic absorption peaks of -Ph- group. Therefore, this indicates that polystyrene and polyacrylamide exist in the solid obtained by interfacial polymerization.

FIG. 12 is a Fourier transform infrared spectrogram of Example 2, in which 3448 $cm^{-1}$ is a characteristic absorption peak of a hydroxyl group in a carboxyl group, 1640 $cm^{-1}$ is a characteristic absorption peak of a carbonyl group in a carboxyl group, 3058 $cm^{-1}$, 3019 $cm^{-1}$, 2915 $cm^{-1}$ and 2845 $cm^{-1}$ are characteristic absorption peaks of —$CH_2$— in a polymer main chain, and 1492 $cm^{-1}$, 1446 $cm^{-1}$, 750 $cm^{-1}$ and 698 $cm^{-1}$ are characteristic absorption peaks of -Ph- group. Therefore, this indicates that polystyrene and polyacrylic acid exist in the solid obtained by interfacial polymerization.

FIG. 13 is a Fourier transform infrared spectrogram of Example 3, in which 1698 $cm^{-1}$ is a characteristic absorption peak of a carbonyl group in poly(methacryloyloxyethyl trimethyl ammonium chloride), 1698 $cm^{-1}$ is a characteristic absorption peak of the carbonyl group, 3056 $cm^{-1}$, 3021 $cm^{-1}$, 2918 $cm^{-1}$ and 2851 $cm^{-1}$ are characteristic absorption peaks of —$CH_2$— in a polymer main chain, and 1493 $cm^{-1}$, 1446 $cm^{-1}$ and 1374 $cm^{-1}$, 750 $cm^{-1}$ and 698 $cm^{-1}$ are characteristic absorption peaks of -Ph- group. 1375 $cm^{-1}$ is characteristic absorption peak of methyl, and 1024 $cm^{-1}$ is the stretching vibration of a single bond of quaternary ammonium salt. Therefore, this indicates that polystyrene and poly(methacryloyloxyethyl trimethyl ammonium chloride) exist in the solid obtained by interfacial polymerization.

Elemental Analysis Test

The amphiphilic nanosheets prepared in Examples 1 to 3 were tested by an organic element analyzer (EA, Vario EL, Elementar, Germany), and the final test results are shown in Table 4.

TABLE 4

Statistical tables of elemental analysis in Examples 1 to 3

| Sample name | N (%) | C (%) | H (%) | S (%) |
|---|---|---|---|---|
| Example 1 | 1.344 | 86.480 | 7.558 | 1.051 |
| Example 2 | 0.004 | 88.123 | 6.629 | 0.792 |
| Example 3 | 0.567 | 87.254 | 8.339 | 0.849 |

It can be seen from Table 4 that the mass fractions of the elements C, O and N in Example 1 are 86.480%, 3.567% and 1.344%, respectively, which indicates that polystyrene and polyacrylamide exist in the solid obtained from the polymer.

The mass fractions of the elements C, O and H in Example 2 are 88.123%, 2.098% and 6.629%, respectively, which indicates that polystyrene and polyacrylic acid exist in the polymer. The mass fractions of elements C, O, H and N in Example 3 are 87.254%, 1.991%, 8.339% and 0.567%, respectively, which indicates polystyrene and poly(methacryloyloxyethyl trimethyl ammonium chloride) exist in the polymer.

Therefore, according to comprehensive analysis from SEM, FTIR, SEM-EDS of Example 1, Example 2 and Example 3 and elemental analysis, three amphiphilic nanosheets with distinct partitions, namely poly(styrene-co-acrylamide) amphiphilic nanosheets, polystyrene-co-acrylic acid) amphiphilic nanosheets and polystyrene-co-methacryloyloxyethyl trimethyl ammonium chloride) amphiphilic nanosheets, are successfully synthesized.

The above descriptions are merely preferred specific embodiments of the present invention, however, the protection scope of the present invention is not limited thereto, and any modifications and substitutions that can be easily conceived by those skilled in the art within the technical scope disclosed by examples of the present invention shall fall within the protection scope of the present invention. Therefore, the protection scope of the present invention shall be subject to the protection scope of the claims.

What is claimed is:

1. A preparation method for an amphiphilic nanosheet, comprising the following steps:

preparing a deep eutectic solvent by mixing choline chloride and urea, and heating to prepare a choline chloride-urea based deep eutectic solvent;

preparing an oil phase solvent by adding styrene, divinylbenzene and azobisisobutyronitrile into a higher alkane solvent with at least 12 carbons, stirring and dissolving to obtain an oil phase solvent, wherein an addition amount of the divinylbenzene is greater than 5% by mass of a styrene monomer; and preparing the amphiphilic nanosheet by adding a hydrophilic monomer, cetyltrimethylammonium chloride and the oil phase solvent into the deep eutectic solvent, stirring and mixing, ventilating and deoxidizing, then heating to 70° C., reacting for at least 6 h, and then crushing and centrifuging to obtain the amphiphilic nanosheet, wherein a mass of the hydrophilic monomer is not greater than 20% by mass of the deep eutectic solvent;

wherein an addition amount of the cetyltrimethylammonium chloride is 0.05% to 0.1% by mass of the deep eutectic solvent;

the hydrophilic monomer is acrylamide, acrylic acid or methacryloxyethyltrimethyl ammonium chloride; and a molar ratio of the hydrophilic monomer to the styrene is greater than 1:1.

2. The preparation method for the amphiphilic nanosheet according to claim 1, wherein a molar ratio of the choline chloride to the urea is 1:1-3.

3. The preparation method for the amphiphilic nanosheet according to claim 1, wherein the higher alkane solvent is dodecane, tetradecane or hexadecane, and a total volume ratio of the higher alkane solvent to the styrene and divinylbenzene is greater than 3:1.

* * * * *